United States Patent
NHS et al.

(10) Patent No.: US 12,099,740 B2
(45) Date of Patent: Sep. 24, 2024

(54) OBJECT STORAGE BASED ASYNCHRONOUS MAILBOX, EVENTUAL CONSISTENCY FOR CROSS-REGION COMMUNICATION

(71) Applicant: Oracle International Corporation, Redwood Shores, CA (US)

(72) Inventors: Harsha Vardhan NHS, Bengaluru (IN); Hochak Hung, Reno, NV (US); Rahul Manohar Kadwe, Sunnyvale, CA (US); Uday Kiran Jangolla, Hyderabad (IN); Kumar Rajamani, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 125 days.

(21) Appl. No.: 17/893,656

(22) Filed: Aug. 23, 2022

(65) Prior Publication Data
US 2024/0069779 A1 Feb. 29, 2024

(51) Int. Cl.
*G06F 3/06* (2006.01)
(52) U.S. Cl.
CPC ............ *G06F 3/065* (2013.01); *G06F 3/0614* (2013.01); *G06F 3/0679* (2013.01)
(58) Field of Classification Search
CPC ....... G06F 3/065; G06F 3/0614; G06F 3/0679
See application file for complete search history.

(56) References Cited

U.S. PATENT DOCUMENTS

2016/0077926 A1* 3/2016 Mutalik .............. G06F 16/1844
  711/162
2022/0179555 A1* 6/2022 Hogan .................. G06F 3/0604

FOREIGN PATENT DOCUMENTS

CN 106919338 A * 7/2017 ........... G06F 3/0647

* cited by examiner

*Primary Examiner* — Masud K Khan
(74) *Attorney, Agent, or Firm* — Hickman Becker Bingham Ledesma LLP (57) ABSTRACT

Techniques are provided for synchronizing database system metadata between primary and standby persistent storage systems using an object store. A first persistent storage system enabled to store first configuration metadata describing the configuration of the first persistent storage system. A first broker process of the first persistent storage system detects receipt, at an object store endpoint, of a new version of an object message sent by a second broker process of a second persistent storage system. The object message specifies a particular value of a configuration attribute of second configuration metadata from the second persistent storage system. In response to detecting receipt of the new version of the object message, the first broker process reads the particular value of the configuration attribute in the object message. The first broker process sets the configuration attribute in the first configuration metadata to the particular value.

20 Claims, 5 Drawing Sheets

OBJECT STORAGE BASED ASYNCHRONOUS MAILBOX, EVENTUAL CONSISTENCY FOR CROSS-REGION COMMUNICATION

FIELD OF THE INVENTION

The present invention relates to object stores and persistent storage systems, such as document stores or relational database systems, and more particularly, implementing an object store for synchronizing configuration data between primary and standby persistent storage systems.

BACKGROUND

Object store technology has become a preferred choice for certain classes of applications (apps) like multimedia servers (Netflix, Haystack), archiving and backup (S3 Glacier, Azure Archive), WORM storage (Spectrum Scale), and others. Additionally, database management systems may implement object stores for synchronizing database data. For instance, redo logs, which contain records of changes made to blocks in a database, may be written to an object store. Standby databases, which serve as backups to a primary database, may access the redo logs from the object store and apply the records of changes to the database data in the standby database in order to synchronize the primary and standby database data.

The redo logs not only record changes to database data of a primary database but also changes to database metadata that defines database objects within a database. Such database metadata may define, for example, tables, table columns, views, and mappings of database files that store data for tables. Database data that defines database objects is stored in a primary or standby database, which is why changes to the database metadata are recorded by records in redo logs. Changes to database metadata that define database objects at a primary database are made at the standby database by applying records in redo logs that record the changes.

Database metadata stored in a primary or standby database is referred to herein as database dictionary metadata. Another type of database metadata, database system metadata, is not stored in primary and standby databases. In general, database system metadata describes how a primary database is configured.

Because database system metadata is not stored in the primary or standby database, database system metadata is not communicated to standby database systems using redo logs via the object store. A solution for synchronizing database system metadata is through direct communication between a primary database and its standby database. The primary and standby database management systems may whitelist connection information for the standby and primary database management systems, respectively. For instance, processes running on the primary and standby database management systems may whitelist corresponding endpoints to facilitate direct communication between the primary and standby databases.

However, whitelisting connection information requires each database management system to ensure that the connection information remains up to date. If connection information for the standby database changes, then the primary database must be made aware of such changes to ensure proper synchronization of database system metadata. Additionally, if the primary database has multiple standby databases, then the primary database would have to keep track of endpoint information for each standby database. Therefore, a mechanism for efficient data synchronization between database management systems is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for synchronizing database system metadata between primary and standby database management systems using an object store. The system for synchronizing database system metadata includes a primary database management system and a standby database management system that are peer database management systems. Peer database management systems are a pair of database management systems in which one is a clone of the other and each are aware of each other's state. For example, the primary database management system may contain one or more database instances and the standby database management system may contain one or more database instances that are clones of the database instances in the primary database management system.

Each of the primary database management system and the standby database management system maintains database system metadata that describes database configuration attributes for each database instance running within the database management system. The database system metadata may be maintained using broker processes running on each of the primary database management system and the standby database management system.

A distributed object store is used by the broker processes to communicate changes to database system metadata to ensure that the database system metadata is synchronized on the primary database management system and the standby database management system. To communicate database system metadata, the broker processes use object messages that the broker processes write to and/or read from the distributed object store.

The distributed object store may include multiple object store regions. An object store region may represent a collection of resources that are located in one particular geographical area. For example, region 1 of the distributed object store may be located in Phoenix Arizona, while region 2 of the distributed object store may be located in San Mateo California. Within the distributed object store, dedicated endpoints may be assigned to each database management system to receive object messages from the other database management system. These endpoint locations are used to pass object messages containing database system metadata values between the primary database management system and the standby database management system.

The broker processes are implemented to detect changes to database system metadata on the respective database management system on which the broker processes run. When a change to database system metadata is detected by the broker process at the primary database management system, the broker process may alert the corresponding broker process running on the standby database management system of the change by generating a new object message and uploading the new object message to the particular endpoint, in the distributed object store, assigned to the broker process of the standby database management system. The new object message contains formatted database configuration attribute values for the particular database running in the primary database management system, including the value for the change.

Upon uploading the new object message to the particular endpoint, the broker process for the standby database management system detects the new object message and reads the new object message to identify the new database configuration value for the particular database. The broker process for the standby database management system then updates the configuration value for the clone of the particular database, thereby ensuring that database system metadata is synchronized between the primary database management system and the standby database management system.

By using endpoints in the distributed object store to pass object messages between primary and standby database management systems, peer database systems are able to efficiently synchronize database system metadata without having to keep track of connection information between database management systems. These techniques allow for primary and standby database management systems to avoid implementing special connection setups, such as whitelisting endpoints of peer databases and ensuring that the connection setups are valid when a change occurs. Additionally, these techniques ensure no loss of database system metadata, by using the endpoints in the distributed object store as opposed of direct endpoints, even when one database management system goes offline for a period of time.

Illustrative DBMS

Figure 1:
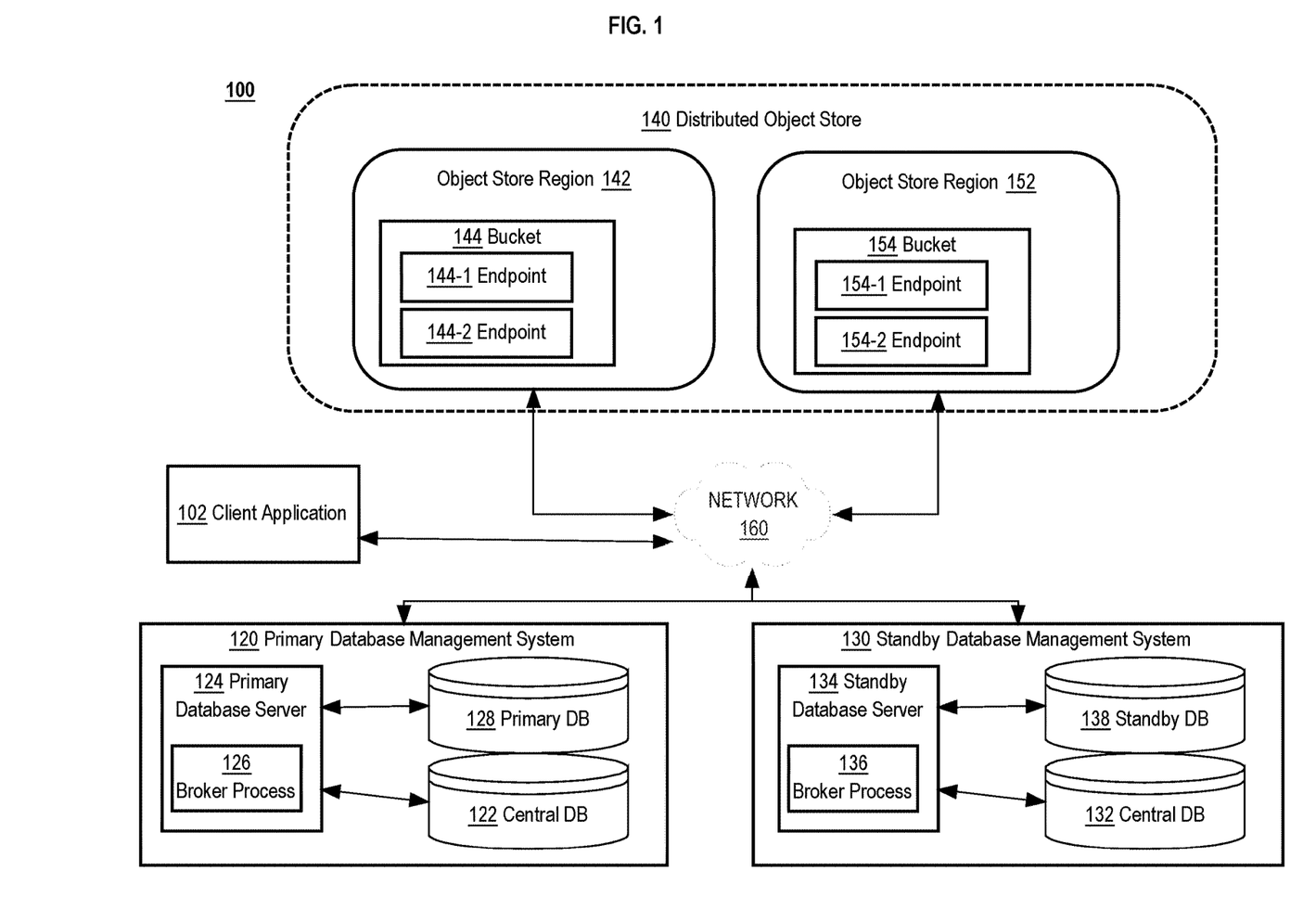
FIG. 1 is a block diagram that depicts an example system for synchronizing data between multiple persistent storage systems using an object store, according to an embodiment.

FIG. 1 is a system diagram that illustrates a distributed persistent storage system 100 in which changes made to data contained in a primary database are applied to a standby database, according to an embodiment. Primary database management system (DBMS) 120 comprises a primary database server 124, a primary database 128, and a central database 122. The standby DBMS 130 comprises a standby database server 134, a standby database 138, and a central database 132. Standby database 138 may be located at a location that is remote relative to primary database 128 but connected through network 160. Network 160 represents one or more local networks, wide area networks, internetworks, or service provider networks. In some embodiments, network 160 represents the Internet. The primary database 128 and standby database 138 represent one or more databases managed by primary DBMS 120 and standby DBMS 130, respectively.

Primary DBMS 120 and standby DBMS 130 are peer database management systems. Two database management systems are considered peer database management systems if one is a clone of the other database and both are continuously aware of each other's state. Primary DBMS 120 and standby DBMS 130 maintain a strict relationship in which database system metadata is synchronized between the DBMSs. Database system metadata describes how a database is configured including its current configuration state and/or current status. For example, database system metadata includes database configuration attributes describing information such as names for each database instance running on the DBMS, number of CPUs provisioned to a particular database, a maximum size allocated to the particular database, an access control list for the database, and any other configuration information used to run an instance of a database. Database system metadata for DBMSs are stored within an internal central database on each DBMS. The internal central database contains records of metadata corresponding to the database instances running on that particular DBMS. For example, primary DBMS 120 contains central database 122 that contains records of metadata corresponding to each database running on primary DBMS 120. Standby DBMS 130 contains central database 132 that contains records of metadata corresponding to each database running on standby DBMS 130. Additionally, central database 122 may contain records corresponding to database system metadata received from standby DBMS 130 and central database 132 may contain records corresponding to database system metadata received from DBMS 120. These cross-region database system metadata may be used to further ensure metadata synchronization.

Client application 102, which could be a client replication service or a software upgrade service, for example, is implemented to send database commands to primary database server 124 or standby database server 134. Primary database server 124 or standby database server 134 receives the database commands from client application 102 and executes the database commands on the primary database management system 120 or standby database management system 130, respectively.

Primary database server 124 is implemented to receive database commands from client application 102 and execute said commands against data in the primary database 128 or the central database 122. The database commands may be requests to retrieve data from or write data to primary database 128. Additionally, the database commands may be requests to update database system metadata stored in central database 122.

In an embodiment, a log writer process of primary database server 124 writes redo records to redo log files. The redo records represent changes to data blocks that were applied to primary database 128. The redo log files are transmitted to standby database server 134 via distributed object store 140.

In an embodiment, redo log files are transmitted to a location in distributed object store 140. Standby database server 134 retrieves the redo log files from the location in distributed object store 140 and applies the redo records to standby database 138. Standby database server 134 may apply the redo records soon after receiving the redo records. As a result, the data contained in standby database 138 is quickly synchronized with the data contained in primary database 128. At any given moment, the content of the data in standby database 138 may reflect the content of the data in primary database 128. However, redo records represent changes made to data stored within primary database 128. Database system metadata is not replicated to standby databases using redo records.

In an embodiment, broker process 126 in primary database server 124 is implemented to maintain database system metadata about all databases running in primary DBMS 120, represented by primary database 128. Similarly, broker process 136 in standby database server 134 is implemented to maintain database system metadata for all databases running in standby DBMS 130. For instance, broker process 126 keeps track of database configuration values stored in central database 122 in standby DBMS 130. If the number of provisioned CPUs changes, then broker process 126 identifies the changed value for provisioned CPUs in the central database 122, generates an object message containing the new value for the number of provisioned CPUs, and sends the object message to broker process 136, running on standby database server 134, via the distributed object store 140. Broker process 136 detects the presence of the message from broker process 126 at a location in the distributed object store 140, processes the object message, and updates the local value for provisioned CPUs for standby database 138 in the central database 132 for standby DBMS 130.

Distributed Object Store

Distributed Object Store 140 is the eventual storage for the data residing in primary database 128. The distributed object store 140 may be implemented as cloud based storage accessible over network 160. An object store is a computer data storage architecture that manages data as objects. Objects in an object store may not be modified in place. A new version of an object may only be created by writing an entire new version of the object to the object store. An object store utilizes a flat address space, called a storage pool. In an embodiment, distributed object store 140 is pre-initialized with an account, a container, and access credentials, prior to the system deployment. The credentials are used by the system during an access such as a read or write.

In an embodiment, the distributed object store 140 may contain two or more regions. A region is a localized geographic area that contains physical resources designated to store objects. Referring to FIG. 1, distributed object store 140 contains two regions, object store region 142 and object store region 152. Each of the object store regions 142 and 152 contain buckets. Buckets are logical containers for storing objects. Each bucket may contain objects belonging to a single group or organized based on particular policies. For instance, bucket 144 and bucket 154 may contain object messages containing database system metadata about databases running in primary DBMS 120 and standby DBMS 130. Other buckets within object store regions 142 and 152 may be designated to store redo log files and/or any other information related to primary DBMS 120 and standby DBMS 130.

Each object in an object store includes data, a globally unique identifier (GUID), and an expandable amount of metadata. The GUID is an address given to an object in order to find the object in object store. Storage system software associated with an object store uses the GUID assigned to the object to find and access any particular object. For example, an object name for an object may be formatted to convey a target object store region as well as a GUID for the object.

In an embodiment, the distributed object store 140 implements a representational state transfer application programming interface (REST API) for storing and retrieving objects from the distributed object store 140. The REST API includes function calls for PUT, GET, and DELETE. The PUT function is used to create an object or a new version of the object and store the object within the distributed object store 140.

In an embodiment, the PUT function includes parameters for specifying a region within the distributed object store 140, a bucket within the region, and a message name representing the name of the object. The PUT function is called as: https://<region location>/<bucketID>/<message_name>. The following is an example PUT function call:

```
PUT
    https://swiftobjectstorage.region142/bucket1/message1
    {payload}
``` where "swiftobjectstorage.region142" is the parameter identifying object store region 142 as the region, "bucket1" as the destination bucket for storing the new object message, and "message1" represents the object message name. The PUT function call is followed by "{payload}" which represents the contents of the object message. The payload for object messages produced by broker processes may be database system metadata for a particular database. For example, if the PUT function call is being used to store a new value for the number of CPUs provisioned for database 1, then the payload would include all database system metadata for database 1, including the "number of CPUs" attribute and its new value. The payload may be formatted into any preferred data format, such as JSON, XML, or any other data format.

The distributed object store 140 is configured to overwrite an entire object message when a new version of the object message is received. That is, if broker process 126 wants to update the number of CPUs provisioned for the particular database, then broker process 126 would have to create a new version of message1 and overwrite the previously stored message1 using the PUT function.

In an embodiment, where there are multiple standby DBMSs, any one standby DBMS may obtain a logical lock for sending a new object message to the primary DBMS by checking the destination bucket of the primary DBMS in the distributed object store 140 for existing object messages. If an existing object message exists, then another standby DBMS has obtained a logical lock for writing object messages. This scenario arises when a failover needs to occur and there are multiple standby DBMSs competing to become the failover candidate. Broker process 136 checks for existing object messages in the distributed object store 140 by running to following command:

```
Request_headers {"if-none-match": "*"}
PUT
    https://swiftobjectstorage.region142/bucket1/message1
    {payload}
``` where the function "Request_headers {"if-none-match": "*"}" checks whether an object message of the same name exists in bucket1. If no object message exists, then the PUT function is performed. If however, an object message does exist in bucket 1, then the PUT function is not performed. For example, if broker process 136 executed the above check and PUT command, then when another broker process from another standby DBMS executes the above check, the outcome of the "if-none-match" conditional would be false and the PUT command for the other broker process would not be executed.

In an embodiment, the DELETE function is used to remove an object message from the distributed object store 140. The DELETE function includes parameters for specifying a region within the distributed object store 140, a bucket within the region, and a message name representing the name of the object. The DELETE function is called as: https://<region location>/<bucketID>/<message_name>. The following is an example DELETE function call:

```
DELETE
    https://swiftobjectstorage.region142/bucket1/message1
``` where "swiftobjectstorage.region142" is the parameter identifying object store region 142 as the target region, "bucket1" as the destination bucket from which to delete the object message named "message1". The DELETE function may be executed after an object message has been processed by a receiving broker process. In some embodiments, the receiving broker process may be configured to wait for a period of time after processing the object message before deleting the object message from the distributed object store 140.

In an embodiment, the GET function is used to retrieve an object message from the distributed object store 140. The GET function may be executed when broker process 136 determines that a new object message is waiting to be processed by broker process 136. The GET function includes parameters for specifying a region within the distributed object store 140, a bucket within the region, and a message name representing the name of the object. The GET function is called as: https://<region location>/<bucketID>/<message_name>. The following is an example GET function call:

```
GET
    https://swiftobjectstorage.region142/bucket1/message1
``` where "swiftobjectstorage.region142" is the parameter identifying object store region 142 as the target region, "bucket1" as the destination bucket for storing the new object message, and "message1" represents the object message name. The output of the GET function call is the object message, message1.

In an embodiment, each object message corresponds to a database running in that DBMS. The naming convention of an object message may contain information conveying the target region, a group ID, and a database ID. The group ID and database ID may represent metadata that describes the cloud provider, a public region name, a database tenant name, and a database tenant ID. The metadata represented by the group ID and database ID may be interpreted by the receiving broker process (broker process 126 or broker process 136) to determine which specific database the configuration value is being provided. For example the following object name:

```
"Region-152/OCI:Region-142:TENANT1:0B166CD_BFEAAE9.json"
is formatted as
    "<Target_Region_name>/< GROUP_ID>_databaseID"
``` where the target region name is "Region-152", the GROUP_ID is "OCI:Region-142:TENANT1:0B166CD", and the database ID is "BFEAAE9". The GROUP_ID contains additional information formatted as "Cloud Provider:Public Region Name:Tenant Name:ID" where the cloud provider is "OCI", the public region name is "Region-142", the tenant name is "TENANT1", and the ID representing a tenant ID is "0B166CD".

A receiving broker process 136 reading the object may be able to determine, from the Group ID in the object name, the cloud provider "OCI", the region name "Region-142", the database tenant "TENANT1", its tenant ID "0B166CD", and the database ID "BFEAAE9". This information is then used to find and update records, in the central database 132 of standby DBMS 130, that correspond to the database system metadata values for database tenant, TENANT1 managed by standby database server 134.

Object Store—Endpoints

In an embodiment, object store endpoints may be designated for specific broker processes to receive object messages from other broker processes for the purpose of communicating changes to database system metadata. These object store endpoints may be referred to herein as mailboxes. Each DBMS may be designated two mailboxes to receive object store messages from a peer DBMS. For example, primary DBMS 120 may be designated two mailboxes to receive object messages from standby DBMS 130, and standby DBMS 130 may be designated two mailboxes to receive object messages from primary DBMS 120. Designating two mailboxes for each DBMS ensures high availability and prevents object message loss if one object store region goes down or is otherwise unavailable. In some embodiments, each DBMS may be assigned additional mailboxes if there are multiple standby DBMSs.

Referring to FIG. 1, primary DBMS 120 may be designated one mailbox, endpoint 144-1, in object store region 142 and another mailbox, endpoint 154-1, in object store region 152. Endpoint 144-1 is a mailbox that resides in the same region as primary DBMS 120. By having endpoint 144-1 in the same region as broker process 126, network latency is reduced as object messages are not required to be retrieved across object store regions. Endpoint 154-1 is a mailbox that resides in a different region than primary DBMS 120. Having endpoint 154-1 in a different region than primary DBMS 120 ensures availability of a mailbox for primary DBMS 120 in case object store region 142 is down for a period of time. Similarly, standby DBMS 130 is designated with one mailbox, endpoint 154-2, in object store region 152 and another mailbox, endpoint 144-2, in object store region 142.

In an embodiment, central database 122 may contain records for endpoint locations for standby DBMS 130 and central database 132 may contain records for endpoint locations for DBMS 120. Broker process 126 may look up these endpoint location records to determine where to upload object messages for standby DBMS 130. For example, broker process 126 may look up in central database 122 the locations for endpoint 144-2 and endpoint 154-2 for sending object messages targeted for standby DBMS 130.

In an embodiment, broker processes 126 and 136 are configured to upload object messages to both of the designated mailboxes of the recipient. This ensures that the object message is stored in at least one mailbox if an object store region goes down. For example, if broker process 126 detects a change to a database configuration value, then broker process 126 would generate a new object message to reflect the change to the database configuration value and put the newly created object message into each of the two mailboxes designated for standby DBMS 130. The PUT function calls executed by broker process 126 may be as follows:

```
PUT
https://swiftobjectstorage.region142/bucket144/message1
PUT
https://swiftobjectstorage.region152/bucket154/message1
``` where "https://swiftobjectstorage.region142/bucket144/message1" specifies writing object message1 to the endpoint 144-2, which is assigned to standby DBMS 130, and "https://swiftobjectstorage.region152/bucket154/message1" specifies writing object message1 to the endpoint 154-2, which is also assigned to standby DBMS 130.

In an embodiment, broker processes 126 and 136 are configured to ensure delivery of an object message to the target mailbox. If an attempt to write to each of the target mailboxes fails, the broker process will retry until the object message is successfully written to at least one of the two target mailboxes. For example, if broker process 136 attempts to write to the mailboxes for primary DBMS 120 (endpoint 144-1 and endpoint 154-1) at a first time, T1, and the write fails, then broker process 136 will retry writing to the mailboxes for primary DBMS 120 again at a second time, T2. If at T2, broker process 136 again fails to successfully write, then broker process 136 will continue to retry the PUT operations to write to the mailboxes of primary DBMS 120 until at least one write is successful.

In an embodiment, broker processes 126 and 136 are implemented to only read and process the latest version of an object message in the distributed object store 140. Previous unread versions of the object message may be ignored by the receiving broker process if a new version exists. For example, broker process 126 is the sending broker process and broker process 136 is the receiving broker process. Broker process 126 sends to the distributed object store 140 a first version of an object message containing database configuration values for DB-1 with a newly updated configuration attribute value for CPU count being equal to 5. The contents of the object message may contain database configuration attributes of CPU count equal to 5 and database maximum size equal to 100 GB. The object message sent by broker process 126 is stored in standby DBMS 130's mailboxes (endpoints 144-2 and 154-2). However, before broker process 136 is able to read and process the object message for database DB-1, broker process 126 detects another change to database configuration values for DB-1. As a result, broker process 126 sends a second version of the object message to the distributed object store 140. The second version of the object message contains database configuration values for DB-1 as: CPU count=5, database maximum size=200 GB. Since the latest version of the object message (second version) has the latest database configuration values for DB-1, the receiving broker (broker process 136) only needs to read and process the latest version of the object message. The previous version of the object message may be ignored, as the latest version of the object message contains the most recent database configuration values.

In an embodiment, broker processes 126 and 136 may be configured to delete object messages from the distributed object store 140 once the object message has been read and after a period of time. For example, broker processes 126 and 136 may be configured to, after reading and processing an object message, delete the object message after 2 minutes. The period of time to delete a read object message may vary and may be configurable and may vary from database instance to database instance or based on any other factor.

Synchronizing Database System Metadata

Database system metadata describing configuration attributes for databases in primary DBMS 120 are synchronized with the standby DBMS 130 using the distributed object store 140 to relay object messages between a sending broker (broker process 126) and a receiving broker (broker process 136). Updates to database configuration values may be triggered by a request from client application 102. For example, an administrator, such as a database administrator, may use client application 102 to update the CPU count for DB-1 from 2 to 5 CPUs. The request to change the CPU count to 5 may be received by the primary database server 124. A process running on the primary database server 124 may update database configuration records for DB-1, stored in central database 122, to reflect the new value for the CPU count. The broker process 126 may detect the change to the CPU count for DB-1 and may generate an object message (message-DB-1) for DB-1 database system metadata. The contents of message-DB-1 contains all of the database configuration values for database DB-1, including the newly updated CPU count=5. The broker process 126 may then lookup the mailbox locations for standby DBMS 130 in the central database 122. The broker process 126 may communicate the CPU count change for DB-1 to the standby DBMS 130 by uploading the message-DB-1 to the mailboxes associated with standby DBMS 130 (endpoint 144-2 and 154-2).

Figure 2:
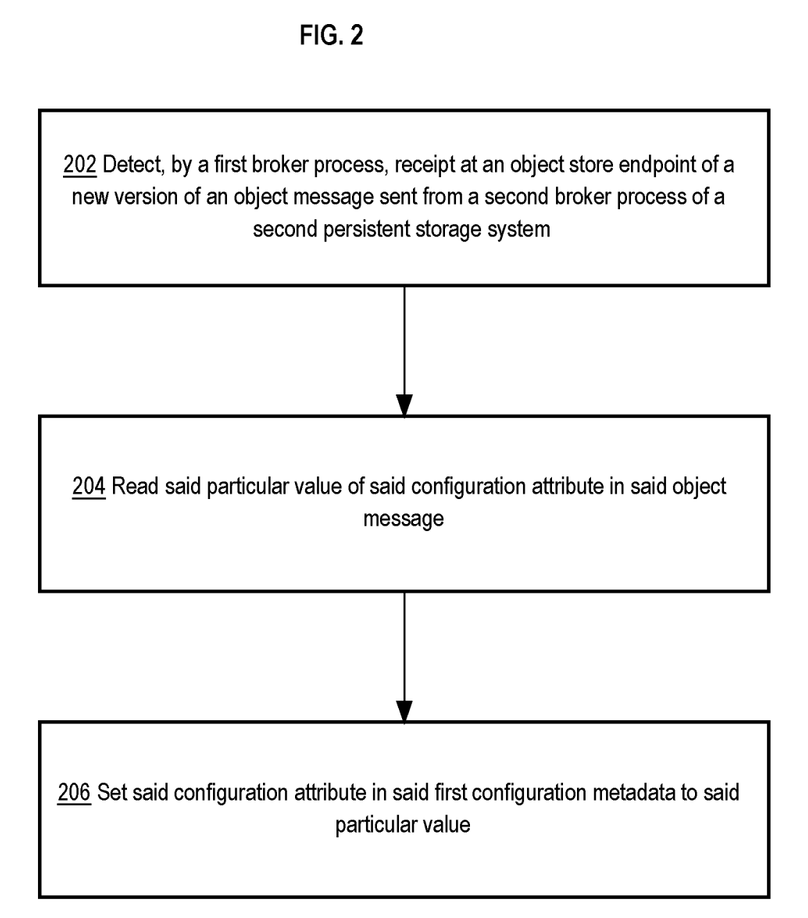
FIG. 2 is a flow diagram that depicts a process for synchronizing database system metadata by receiving metadata change messages, via an object store, and applying metadata changes to a standby database management system, according to an embodiment

FIG. 2 is a flow diagram that depicts a process 200 for synchronizing database system metadata by receiving metadata change messages, via an object store, and applying metadata changes to a standby database management system, according to an embodiment. The steps of the process as shown in FIG. 2 may be implemented using processor-executable instructions that are stored in computer memory. For the purposes of providing a clear example, the steps of FIG. 2 are described as being performed by a process executing on the standby DBMS 130. For the purposes of clarity, the process described may be performed with more or fewer steps than described in FIG. 2.

At step 202, a first broker process detects receipt at an object store endpoint of a new version of an object message sent from a second broker process. In an embodiment, the first broker process may represent broker process 136 running on standby database server 134. Broker process 136 detects receipt, at endpoint 154-2 or endpoint 144-2, of a new version of the object message, message DB-1, sent by broker process 126 running on primary database server 124. Message DB-1 may contain database system metadata describing configuration values for database DB-1 running in primary database 128. For example, the metadata contains an updated CPU count value=5 for database DB-1.

In an embodiment, broker process 136 may be implemented to periodically check its assigned endpoints, endpoint 154-2 and endpoint 144-2, in the distributed object store 140 for any new versions of object messages. When a new version of an object message is detected, broker process 136 may read the object message and apply any changes to database system metadata to metadata records stored in the central database 132, in standby DBMS 130.

At step 204, the first broker process reads the particular value of the configuration attribute in the object message. In an embodiment, in response to detecting object message message-DB1 at endpoint 154-2, broker process 136 processes message-DB-1 and reads the new value for the configuration attribute, CPU count, which is set to 5.

At step 206, the first broker process sets the configuration attribute in the first configuration metadata to the particular value. In an embodiment, broker process 136 sets the CPU count attribute value for database DB-1 to equal the new value of 5. For example, broker process 136 may update records in the central database 132 corresponding to the database DB-1 CPU count value to 5. Thereby replicating the changes made to the corresponding database DB-1 running on primary database 128. Additionally, the central database 132 may contain records reflecting database system metadata of primary database 128. The broker process 136 may then update these records to reflect the metadata changes to DB-1 running on primary database 128.

Role Transition

In an embodiment, the distributed object store 140 may be used to perform a transition of database roles where the standby DBMS 130 becomes the new primary and the primary DBMS 120 become the new standby. This process may be initiated by a user, such as a database administrator. For instance, a database administrator may use client application 102 to send a role transition request to the standby DBMS 130 to initiate the role transition.

In an embodiment, the distributed object store 140 may reserve a dedicated bucket and endpoint for performing role transitions, hereby referred to as the role transition endpoint. The role transition endpoint is used to maintain a logical lock for the role transition process. When a standby DBMS initiates a role transition, that standby DBMS will attempt to obtain the logical lock for role transitioning. Once the logical lock is obtained, that standby DBMS will be able to proceed with transitioning to become the new primary DBMS.

Figure 3:
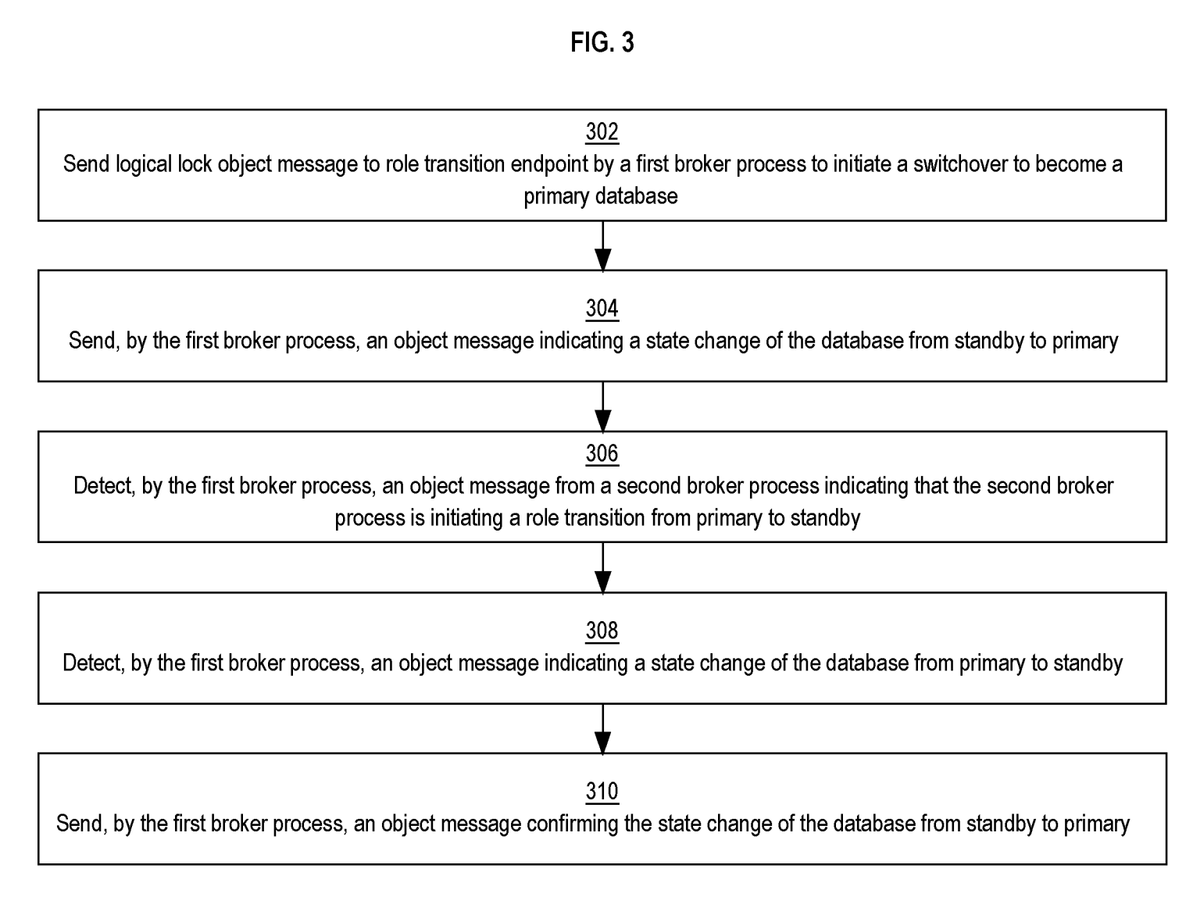
FIG. 3 is a flow diagram that depicts a process for performing a switchover between primary and standby databases using the object store, according to an embodiment.

FIG. 3 is a flow diagram that depicts a process 300 for performing a switchover between primary and standby databases using the object store, according to an embodiment. The steps of the process as shown in FIG. 3 may be implemented using processor-executable instructions that are stored in computer memory. For the purposes of providing a clear example, the steps of FIG. 3 are described as being performed by a process executing on the standby DBMS 130. For the purposes of clarity, the process described may be performed with more or fewer steps than described in FIG. 3.

At step 302, a first broker process sends a logical lock object message to a role transition endpoint to initiate a switchover to become a primary database. In an embodiment, broker process 136, upon receiving a switchover request from client application 102, sends a logical lock object message to the role transition endpoint in distributed object store 140. As described, the role transition endpoint is an endpoint dedicated to holding a logical lock for a DBMS attempting to switch from being a standby database to a primary database.

The logical lock object message may be performed using the following command:

Request_headers {"if-none-match": "*"}
PUT
https://swiftobjectstorage.region142/role-transition/logical-lock-message1 where the function "Request_headers {"if-none-match": "*"}" checks the role transition endpoint to determine whether an object message exists in the role-transition bucket. If no object message exists, then that means no other standby DBMS has initiated the role transition and the PUT function to upload the logical-lock-message1 is performed. If however, an object message does exist in the role-transition bucket, then the PUT function is not performed and DBMS 130 would not proceed with the role transition.

Broker process 126 of primary DBMS 120 is configured to periodically check the role transition endpoint for a logical-lock-message which would indicate a possible switchover event. Upon successful placement of the logical-lock-message in the role transition endpoint, broker process 126 would detect the presence of the logical-lock-message. Broker process 126 does not yet start the shutdown process until broker process 126 detects an object message in one of its own mailboxes (endpoint 144-1 or endpoint 154-1).

At step 304, the first broker process sends an object message indicating a state change of the database from standby mode to primary mode. In an embodiment, broker process 136, in response to successfully obtaining the logical lock, updates the state of DBMS 130 in the central database 132 from standby mode to primary mode. This update triggers broker process 136 to generate and send an object message to the primary DBMS 120 mailboxes (endpoint 144-1 and endpoint 154-1). The object message contains database system metadata indicating that DBMS 130 is now set to primary mode.

In an embodiment, broker process 126 detects the new object message indicating that DBMS 130 is now set to primary mode. This object message acts as an acknowledgement to the logical-lock-message and triggers primary DBMS 120 to start transitioning from primary mode to standby mode. Primary DBMS 120 then starts to shutdown by closing client connections and generating redo logs that are sent to the distributed object store 140. Upon starting the shutdown process, broker process 126 sends an object message to the standby DBMS 130 mailboxes (endpoint 144-2 and endpoint 154-2) containing database system metadata indicating that broker process 136 has updated its database system metadata to indicate that DBMS 120 is now set to standby mode.

At step 306, the first broker process detects an object message from the second broker process indicating that the second broker process is initiating a role transition from primary to standby. In an embodiment, broker process 136 detects the object message from broker process 126. This object message may serve as an acknowledgement that primary DBMS 120 has received the role transition messages from standby DBMS 120 and has started the role transition.

In an embodiment, the broker process 136, upon detecting the object message from broker process 126, starts the transition to primary mode by fetching all redo logs from the distributed object store 140 and applying the redo records to the databases in standby DBMS 130.

At step 308, the first broker process detects an object message indicating a state change from primary to standby. In an embodiment, broker process 136 detects an object message in either endpoint 144-2 or 154-2 that includes database system metadata indicating that primary DBMS 120 has completed the role transition to standby mode. Broker process 136 updates records in the central database 132 to reflect the new state of DBMS 120 as standby. DBMS 130 then completes processing of any remaining redo logs and changes its state in the central database 132 from standby mode to primary mode.

At step 310, the first broker process sends an object message confirming the state change of the database from standby to primary. In an embodiment, broker process 136 generates and sends an object message to the DBMS 120 mailboxes (endpoint 144-1 and endpoint 154-1) containing database system metadata indicating that DBMS 130 is now the primary DBMS. The broker process 126, upon detecting the new object message indicating that DBMS 130 is now the primary, updates records in its entity database 120 and performs steps to function as the standby DBMS, such as refusing any client connections and pulling redo logs from the distributed object store 140.

In an embodiment, broker process 136, upon completing the role transition, deletes the logical lock object message from the role transition endpoint in distributed object store 140. By deleting the logical lock message from the role transition endpoint, the logical lock for switching roles of a DBMS has been removed, thereby allowing future role transitions to occur.

A failover occurs when the primary DBMS 120 is unresponsive and the standby DBMS 130 must become the new primary DBMS. A failover event differs from a switchover event because the primary DBMS may not be able to acknowledge all of the object messages received in the role transition process. In an embodiment, if a failover is needed, the standby DBMS 130 may receive a request to failover to primary mode from client application 102. In other embodiments, standby DBMS 130 may be configured to automatically initiate failover if no response is received by the primary DBMS 120 after a period of time.

Standby DBMS 130 begins the failover process by broker process 136 sending a logical lock object message to the role transition endpoint in distributed object store 140. After successfully uploading the logical lock object message to the role transition endpoint in distributed object store 140, the broker process 136 updates the state of DBMS 130 in the central database 132 from standby mode to primary mode. Broker process 136 then generates and sends an object message to the primary DBMS 120 mailboxes (endpoint 144-1 and endpoint 154-1).

In an embodiment, since primary DBMS 120 may be unresponsive, broker process 136 starts the transition to primary mode by fetching all redo logs from the distributed object store 140 and applying the redo records to the databases in standby DBMS 130. In another embodiment, broker process 136 may wait to detect an object message from broker process 126 indicating a state change from primary to standby by primary DBMS 120. However, this object message from broker process 126 may or may not arrive due to the unresponsiveness of primary DBMS 120.

Upon completion of the transition from standby mode to primary mode by DBMS 130, the broker process 136 generates and sends an object message to the DBMS 120 mailboxes (endpoint 144-1 and endpoint 154-1) containing database system metadata indicating that DBMS 130 is now the primary DBMS. DBMS 130 is now the new primary. If and when DBMS 120 comes back online, broker process 126 will start to process any pending object messages in its mailboxes (endpoint 144-1 and endpoint 154-1), including the last object message indicating that DBMS 130 is the new primary. Upon detecting that DBMS 130 is the new primary, broker process 126 will initiate steps to convert DBMS 120 into standby mode.

Alternative Embodiments in Other Types of Persistent Storage Systems

As mentioned earlier, embodiment may be implemented in forms of PSSs that support transaction processing other than a DBMS. In addition to a DBMS, a PSS may be, for example, a file system (FS), or a document storage system (DOCS). In general, a PSS stores records in collections; each record in the collection includes record attributes. A collection of records may be (1) a database table managed by a DBMS, where the database table is a collection of records in the form of rows and the columns of the database table correspond to record attributes; (2) a file managed by a file storage system, where the file is a collection of records in the form of blocks or lines, and where delimited or fixed length fields of the file records correspond to record attributes; and (3) a document collection managed by a DOCS, where the document collection is a collection of records in the form of documents, where JSON fields or XML elements may be record attributes.

A DOCS may comprise one or more document storage servers, having one or more processors, memory, and persistent storage in which documents are stored. A DOCS provides access to documents through a document storage protocol that supports, among other features, CRUD-based ("create, read, update, delete") to create or insert documents and to modify documents within transactions.

Similar to a database dictionary, a DOCS includes dictionary that defines attributes of collections. The attributes may be modified by sending DDL commands that to the DOCS that specify the changes to the definitions. A database comprises a set of collections that are defined by a database dictionary of the database.

Transaction Processing Overview

In transaction processing, changes to collections of records are made by transactions. A transaction is a set of operations that attribute values or definitions of attributes. All the changes for a transaction are made atomically. The changes are made permanent by committing the transaction. If the transaction cannot be committed, or is aborted or otherwise not committed, the transaction is rolled back.

Transaction processing, as the term is used herein, also requires journaling. In journaling, changes made by a transaction to a records of a collection or to the definition of an attribute of the collection are stored in a persistent journal. A redo log used by a DBMS is an example of a persistent journal. A persistent journal comprises change records that record changes made by a transaction. A change record may specify what field, column, elements or attributes were changed and the new values thereof created by the change. The old values that were replaced by the new value may also be specified. A change record may also specify a change to a definition of an attribute.

A journal can be read by another PSS to replicate changes specified in the journal. Such replication includes changing values in replicas of the collections at the other PSS and changing a replica dictionary at the other PSS.

Implementation Mechanisms—Software Overview

Figure 4:
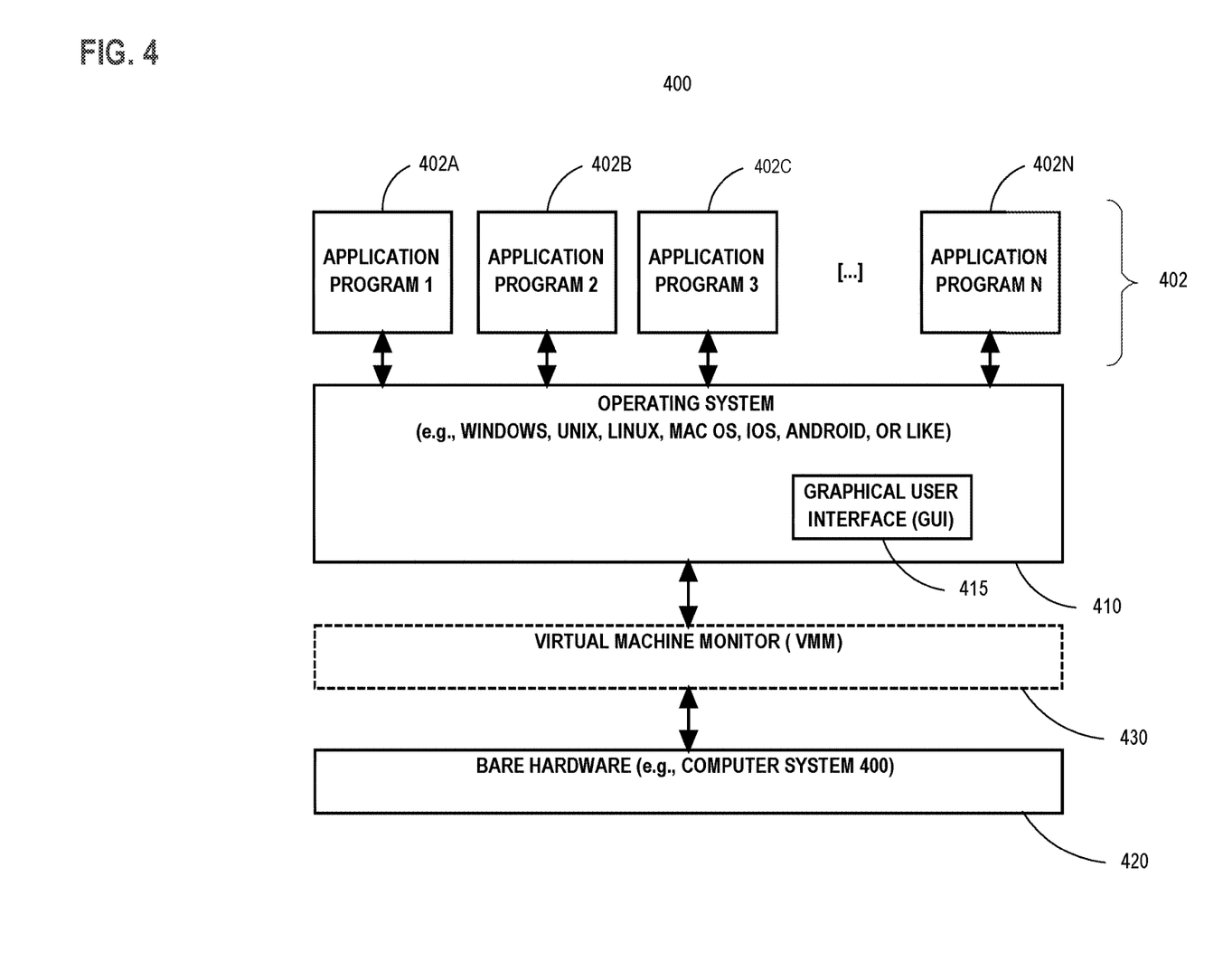
FIG. 4 is a block diagram depicting a software system upon which an embodiment of the invention may be implemented.
Figure 5:
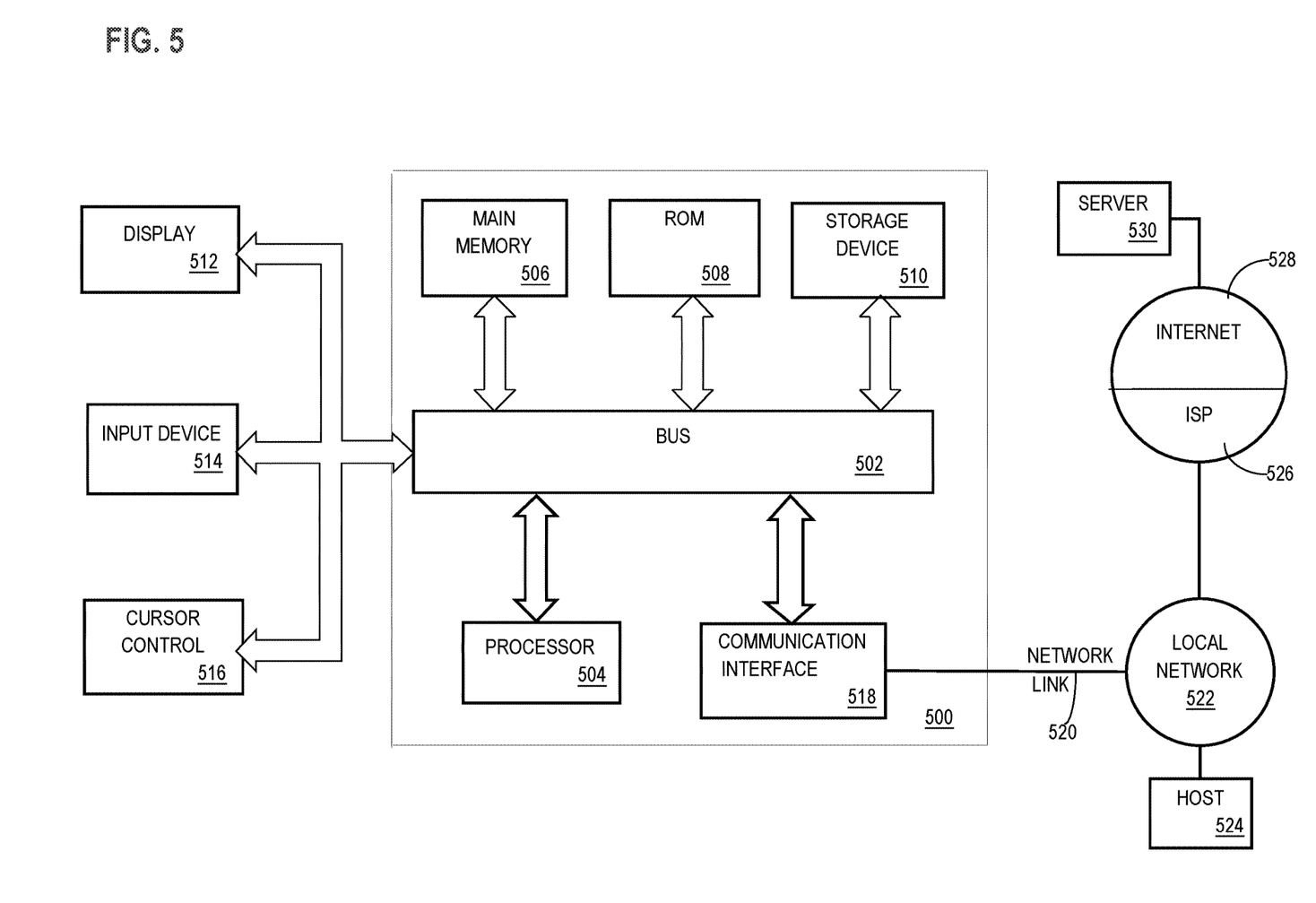
FIG. 5 is a block diagram that illustrates a computer system upon which an embodiment of the invention may be implemented.

FIG. 4 is a block diagram of a basic software system 400 that may be employed for controlling the operation of computing system 500 of FIG. 5. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 600 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Implementation Mechanisms—Hardware Overview

Referring now to FIG. 5, it is a block diagram that illustrates a computing device 500 in which the example embodiment(s) of the present invention may be embodied. Computing device 500 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor.

Main memory 506, such as a random access memory (RAM) or other dynamic storage device, also may be coupled to bus 502 for storing information and software instructions to be executed by processor(s) 504. Main memory 506 also may be used for storing temporary variables or other intermediate information during execution of software instructions to be executed by processor(s) 504.

Software instructions, when stored in storage media accessible to processor(s) 504, render computing device 500 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and software instructions for processor(s) 504.

One or more mass storage devices 510 may be coupled to bus 502 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such software instructions may be read into main memory 506 from another storage medium, such as storage device(s) 510. Execution of the software instructions contained in main memory 506 cause processor(s) 504 to perform the functions of the example embodiment(s).

While functions and operations of the example embodiment(s) may be implemented entirely with software instructions, hard-wired or programmable circuitry of computing device 500 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or electromagnetic waves, such as those generated during radio-wave and infra-red data communications.

Various forms of media may be involved in carrying one or more sequences of one or more software instructions to processor(s) 504 for execution. For example, the software instructions may initially be carried on a magnetic disk or solid-state drive of a remote computer. The remote computer can load the software instructions into its dynamic memory and send the software instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the software instructions. The software instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution.

Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method, comprising:
   a first broker process of a first Persistent Storage System (PSS) detecting receipt at an object store endpoint of a new version of an object message sent from a second broker process of a second PSS, wherein said first PSS stores first configuration metadata describing configuration of said first PSS, wherein said object message specifies a particular value of a configuration attribute of second configuration metadata stored as said second PSS;
   in response to detecting said receipt of said new version of said object message at said object store endpoint, said first PSS reading said particular value of said configuration attribute in said object message; and
   said first PSS setting a configuration attribute in said first configuration metadata, corresponding to said configuration attribute of said second configuration metadata, to said particular value.

2. The computer-implemented method of claim 1, further comprising:
   said first PSS storing replicas of collections of records modified at said second PSS;
   said first PSS applying change records to said replicas, said change records specifying changes to definitions of particular attributes of said collection and changes to values of said particular attributes;
   wherein value changes to said particular attributes are not tracked in change records generated by said second PSS.

3. The computer-implemented method of claim 1, further comprising:
   before said second PSS set said configuration attribute to said particular value, said second PSS set said configuration attribute in said second configuration metadata to a previous value;
   wherein said first PSS set said configuration attribute in said first configuration metadata to said particular value without having set said configuration attribute to said previous value.

4. The computer-implemented method of claim 3, wherein said first PSS set said configuration attribute in said first configuration metadata to said particular value without having read a version of said object message that specified said previous value for said configuration attribute.

5. The computer-implemented method of claim 1, further comprising:
   said first broker process of said first PSS detecting receipt at said object store endpoint of another version of an object message sent from said second broker process;
   in response to detecting said receipt of said another version of an object message at said object store endpoint, said first PSS reading another value of said configuration attribute in said new version of said object message;
   said first PSS setting said configuration attribute in said first configuration metadata to another value.

6. The computer-implemented method of claim 1, further comprising:
   prior to detecting receipt at said object store endpoint of said new version of said object message, said first broker process determining an address location of said object store endpoint in an object store from said first configuration metadata.

7. The computer-implemented method of claim 1, further comprising:
   prior to detecting receipt at said object store endpoint of said new version of said object message, said first broker process monitoring said object store endpoint and a second object store endpoint for said new version of said object message sent from said second broker process;
   wherein said object store endpoint and said second object store endpoint are configured to receive versions of said object message from said second broker process, wherein said object store endpoint and said second object store endpoint are located in different regions of an object store.

8. The computer-implemented method of claim 1, wherein an object store contains a plurality of buckets; wherein said object store endpoint is located within a dedicated bucket of said plurality of buckets within said object store.

9. A non-transitory computer-readable storage medium storing sequences of instructions that, when executed by one or more processors, cause:
   a first broker process of a first Persistent Storage System (PSS) detecting receipt at an object store endpoint of a new version of an object message sent from a second broker process of a second PSS, wherein said first PSS stores first configuration metadata describing configuration of said first PSS, wherein said object message specifies a particular value of a configuration attribute of second configuration metadata stored as said second PSS;
   in response to detecting said receipt of said new version of said object message at said object store endpoint, said first PSS reading said particular value of said configuration attribute in said object message; and
   said first PSS setting a configuration attribute in said first configuration metadata, corresponding to said configuration attribute of said second configuration metadata, to said particular value.

10. The non-transitory computer-readable storage medium of claim 9, the sequences of instructions including instructions that, when executed by said one or more processors, cause:
    said first PSS storing replicas of collections of records modified at said second PSS;

said first PSS applying change records to said replicas, said change records specifying changes to definitions of particular attributes of said collection and changes to values of said particular attributes;

wherein value changes to said particular attributes are not tracked in change records generated by said second PSS.

11. The non-transitory computer-readable storage medium of claim 9, the sequences of instructions including instructions that, when executed by said one or more processors, cause:

before said second PSS set said configuration attribute to said particular value, said second PSS set said configuration attribute in said second configuration metadata to a previous value;

wherein said first PSS set said configuration attribute in said first configuration metadata to said particular value without having set said configuration attribute to said previous value.

12. The non-transitory computer-readable storage medium of claim 11, wherein said first PSS set said configuration attribute in said first configuration metadata to said particular value without having read a version of said object message that specified said previous value for said configuration attribute.

13. The non-transitory computer-readable storage medium of claim 9, the sequences of instructions including instructions that, when executed by said one or more processors, cause:

said first broker process of said first PSS detecting receipt at said object store endpoint of another version of an object message sent from said second broker process;

in response to detecting said receipt of said another version of an object message at said object store endpoint, said first PSS reading another value of said configuration attribute in said new version of said object message;

said first PSS setting said configuration attribute in said first configuration metadata to another value.

14. The non-transitory computer-readable storage medium of claim 9, the sequences of instructions including instructions that, when executed by said one or more processors, cause:

prior to detecting receipt at said object store endpoint of said new version of said object message, said first broker process determining an address location of said object store endpoint in an object store from said first configuration metadata.

15. The non-transitory computer-readable storage medium of claim 9, the sequences of instructions including instructions that, when executed by said one or more processors, cause:

prior to detecting receipt at said object store endpoint of said new version of said object message, said first broker process monitoring said object store endpoint and a second object store endpoint for said new version of said object message sent from said second broker process;

wherein said object store endpoint and said second object store endpoint are configured to receive versions of said object message from said second broker process, wherein said object store endpoint and said second object store endpoint are located in different regions of an object store.

16. The non-transitory computer-readable storage medium of claim 9, wherein an object store contains a plurality of buckets; wherein said object store endpoint is located within a dedicated bucket of said plurality of buckets within said object store.

17. A computer-implemented method, comprising:

a first broker process of a first Persistent Storage System (PSS) sending a first object message to a first object store endpoint, wherein said first object store endpoint is an endpoint configured to store a logical lock for switching roles of said first PSS and a second PSS;

said first broker process sending, to a second object store endpoint, a second object message, wherein said first PSS stores first configuration metadata describing configuration of said first PSS, wherein said second object message specifies a new value of a role configuration attribute of said first configuration metadata, wherein said role configuration attribute of said first configuration metadata specifies a role for said first PSS;

said first broker process detecting receipt at a third object store endpoint of a third object message sent from a second broker process of said second PSS, wherein said third object message specifies that said second PSS has initiated a role transition;

said first broker process detecting receipt at said third object store endpoint of a new version of a third object message sent from a second broker process of said second PSS, wherein said third object message specifies a new value of a role configuration attribute of second configuration metadata, wherein said role configuration attribute of said second configuration metadata specifies a role for said second PSS; and said first broker process sending, to said second object store endpoint, a new version of said second object message, wherein said new version of said second object message specifies a confirmation of said new value of said role configuration attribute of said first configuration metadata.

18. The computer-implemented method of claim 17, wherein said new value of said role configuration attribute of said second configuration metadata for said second PSS is equal to standby mode, and wherein said new value of said role configuration attribute of said first configuration metadata for said first PSS is equal to primary mode.

19. The computer-implemented method of claim 17, further comprising said first broker process deleting said first object message from said first object store endpoint.

20. The computer-implemented method of claim 17, further comprising, prior to said first broker process sending said first object message to said first object store endpoint, said first broker process determining that said first object store endpoint does not contain an existing object message.

\* \* \* \* \*